(12) United States Patent
Klemets et al.

(10) Patent No.: US 7,882,356 B2
(45) Date of Patent: Feb. 1, 2011

(54) UPNP AUTHENTICATION AND AUTHORIZATION

(75) Inventors: Anders Klemets, Redmond, WA (US); Bruno Kraychete da Costa, Redmond, WA (US); James T. Walter, Jr., Issaquah, WA (US); Kasy Srinivas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 11/549,459

(22) Filed: Oct. 13, 2006

(65) Prior Publication Data

US 2008/0092211 A1   Apr. 17, 2008

(51) Int. Cl.
 *H04L 9/32* (2006.01)
(52) U.S. Cl. ............... 713/172; 713/168; 713/170; 713/175
(58) Field of Classification Search ............. 713/156, 713/157, 159, 172, 177, 168, 170, 175
See application file for complete search history.

(56) References Cited

U.S. PATENT DOCUMENTS

| | | | |
|---|---|---|---|
| 6,401,211 B1 | 6/2002 | Brezak, Jr. et al. | |
| 6,952,475 B1 * | 10/2005 | Horn et al. .................. | 380/30 |
| 7,093,296 B2 | 8/2006 | Nusser et al. | |
| 7,363,278 B2 | 4/2008 | Schmelzer et al. | |
| 7,376,581 B2 | 5/2008 | DeRose et al. | |
| 7,644,174 B2 * | 1/2010 | Ryu et al. .................. | 709/231 |
| 2002/0026503 A1 * | 2/2002 | Bendinelli et al. .......... | 709/220 |
| 2002/0056040 A1 * | 5/2002 | Simms .................... | 713/171 |
| 2003/0126239 A1 | 7/2003 | Hwang | |
| 2003/0236978 A1 | 12/2003 | Evans et al. | |
| 2004/0083303 A1 | 4/2004 | Hwang | |
| 2004/0243700 A1 | 12/2004 | Weast | |
| 2004/0243834 A1 | 12/2004 | Stefik et al. | |
| 2004/0260786 A1 | 12/2004 | Barile | |
| 2005/0027990 A1 | 2/2005 | Ogawa | |
| 2005/0086514 A1 | 4/2005 | Han et al. | |
| 2005/0114896 A1 | 5/2005 | Hug et al. | |
| 2005/0125564 A1 * | 6/2005 | Bushmitch et al. .......... | 709/250 |
| 2005/0136905 A1 * | 6/2005 | Son et al. .................... | 455/418 |

(Continued)

FOREIGN PATENT DOCUMENTS

WO   9925093 A2   5/1999

(Continued)

OTHER PUBLICATIONS

UPnP Device Architecture 1.0, May 6, 2003, Contributing mebers of the UPnP forum.*

(Continued)

*Primary Examiner*—Matthew B Smithers
*Assistant Examiner*—Jing Sims
(74) *Attorney, Agent, or Firm*—Senniger Powers LLP

(57) ABSTRACT

A secure handshake service is implemented among a plurality of UPnP (Universal Plug and Play) portable media devices and endpoints in an open network hosting one or more UPnP services. A first portable media device receives a first request for a hosted service from a second portable media device via the network. The first portable media device authenticates authorizes the second portable media device as a function of the certificate of the request. The second portable media device is allowed to access the requested service hosted on the first portable media device if the second portable media device has been authenticated and authorized by the first portable media device.

18 Claims, 8 Drawing Sheets

U.S. PATENT DOCUMENTS

| | | | |
|---|---|---|---|
| 2005/0138193 A1 | 6/2005 | Encarnacion et al. | |
| 2005/0149450 A1 | 7/2005 | Stefik et al. | |
| 2005/0188193 A1 | 8/2005 | Kuehnel et al. | |
| 2005/0210279 A1* | 9/2005 | Lee et al. | 713/194 |
| 2005/0240758 A1* | 10/2005 | Lord et al. | 713/153 |
| 2005/0266826 A1 | 12/2005 | Vlad | |
| 2005/0286546 A1 | 12/2005 | Bassoli et al. | |
| 2006/0112417 A1 | 5/2006 | Son et al. | |
| 2006/0143295 A1 | 6/2006 | Costa-Requena et al. | |
| 2007/0143488 A1* | 6/2007 | Pantalone | 709/230 |

FOREIGN PATENT DOCUMENTS

| | | | |
|---|---|---|---|
| WO | 2005093543 A1 | 10/2005 | |
| WO | 2006018781 A1 | 2/2006 | |

OTHER PUBLICATIONS

Kangas, "Authentication and Authorization in Universal Plug and Play Home Networks," Research Seminar on Telecommunications Software, 2002, 12 pages, Ad Hoc Mobile Wireless Networks.

Sengodan et al., "On Securing Home Networks," 8 pages, Nokia Research Center, USA.

Keinanen et al., "Secure UPnP and Networked Health Care," ERCIM News, No. 63, Oct. 2005, 2 pages, USA.

Bassoli et al., "tunA: Local Music Sharing with Handheld Wi-Fi Devices," Fifth Wireless World Conference, University of Surrey, 23 pages, Jul. 2004, UK.

Unknown, "The Sound of Starbucks," printed from http://www.hearmusic.com/#ABOUT_US, printed on Sep. 19, 2006, 1 page, Starbucks Corporation, USA.

Unknown, "Vision: Listen Without Limits," printed from http://www.musicgremlin.com/About/Vision/visionListen.aspx, printed on Oct. 12, 2006, 2 pages, MusicGremlin, Inc., USA.

Unknown, "The Best Jukebox and #1 Music Download Store. Now With Video," printed from http://www.apple.com/itunes/overview, printed on Aug. 24, 2006, 2 pages, 2006, Apple Computer, Inc., USA.

Unknown, "Movies, TV Shows, Games, and Music. Now Playing on an iPod Near You," printed from http://www.apple.com/ipod/ipod.html, printed on Oct. 12, 2006, 3 pages, Apple Computer, Inc., USA.

Menezes et al., "Handbook of Applied Cryptography, Chapter 10," CRC Press, 1997, pp. 385-420, USA.

* cited by examiner

UPNP AUTHENTICATION AND AUTHORIZATION

BACKGROUND

The UPnP (Universal Plug and Play) architecture provides network connectivity of consumer electronics devices such as appliances, wireless devices, electronics, portable media devices and personal computers. UPnP is a distributed, open networking architecture that leverages TCP/IP and the Web technologies to enable proximity networking and control data transfer among networked devices in the home, office, and public spaces. UPnP is designed to support zero-configuration, "invisible" networking, and automatic discovery for a breadth of device categories from a wide range of vendors. Devices can dynamically join a network, obtain an IP address, convey its capabilities, and learn about the presence and capabilities of other devices. Also, a UPnP device can leave a network without leaving any unwanted state behind.

In the UPnP model, all devices are assumed to be implicitly authorized to make any possible request to enable the so-called "invisible" networking. Without authentication, however, a device that receives a UPnP request from another UPnP device does not know if the device sending the request is authorized to make such requests. Because UPnP was designed for home networks and the like in which all devices are assumed to be trusted, the authentication and authorization of devices was not necessary. However, even within home networks, the lack of support for authorization and authentication in UPnP can be problematic. For example, suppose the shared network is implemented in a college dormitory or in an environment utilizing wireless technology (e.g., Wi-Fi). In such cases, an owner of a UPnP-based file server may not want to grant unrestricted access to the files that are stored on a server of the network because the owner may not be able to trust all other UPnP devices capable of accessing the network.

In another example, suppose the manufacturer of a UPnP-based media server capable of streaming high-definition video may wish to limit the access to the high-definition video content to devices that are licensed and capable of rendering the high-definition video content while streaming a standard-definition version of the video content to other devices. In other words, the manufacturer of UPnP devices may wish to permit access to a subset of UPnP devices, such as those made by the same manufacturer.

Existing solutions to the authentication and authorization problems are either incomplete, not sufficiently secure, or tied to a Digital Rights Management (DRM) system. For example, a common solution to the authentication problem is to look for a well-known human readable string in one or more of the UPnP messages. The string can be in the User-Agent protocol header or it can be embedded in the device description document, an XML-format document that can be downloaded from all UPnP devices. A first UPnP device that wants to authenticate a second UPnP device checks for the presence of one of these strings. If found, the first UPnP device would consider the second UPnP device to be authenticated. However, this solution is not secure because the strings are transmitted in a clear human readable form which is trivial to replicate.

In another existing solution, the UPnP device receiving the request looks up the Ethernet MAC (Media Access Control) address of a UPnP request in a table of addresses of authorized devices. If the MAC address of the requesting device is found, the device is considered to be authorized. Otherwise, the user of the receiving device is given the option of granting access to the requesting device and adding its address to the table. However, this solution is not secure because Ethernet MAC addresses are relatively easy to "spoof" or forge.

Furthermore, the solution is impractical in the scenario where a UPnP device wants to restrict access to only certain licensed or approved devices. Because Ethernet MAC addresses are usually stored in a hardware chip that is manufactured separately from the UPnP software. It is usually impractical for the software manufacturer to create a table of authorized Ethernet MAC addresses because the MAC addresses of the approved devices are not known at the time the software is created. Additionally, in this scenario, it is not desirable to prompt the user to add the MAC address to the table of authorized MAC addresses because the user may grant access to an unlicensed or unapproved device.

A third solution is provided by conventional DRM systems. Although a DRM system allows two devices to authenticate each other and to transfer audio/video content in encrypted form, this very specialized solution is not applicable in all scenarios. For example, it may not always be desirable to encrypt the content that is being transferred as is required by DRM systems. Also, some DRM systems have a secure (encryption-based) message exchange during the transfer audio/video content, but the discovery of the content (through the UPnP ContentDirectory service) is not covered by this secure message exchange. Thus, a first device may discover content in the ContentDirectory service of a second device without knowing if the first device is authorized to stream the discovered content.

SUMMARY

Embodiments of the invention overcome one or more deficiencies in the known UPnP protocol by providing a secure service for UPnP devices to authenticate and authorize each other and other UPnP endpoints. According to aspects of the invention, a UPnP initiator device sends a request to a UPnP responder device that includes identification information from a trusted authority. The responder authenticates the identity of the initiator device via the trusted authority and authorizes the device as a function of the identification information.

In another aspect, the invention establishes a session identifier during the authentication and authorization process. The session identifier is included in a response to the initiator to match subsequent UPnP or HTTP requests from the initiator to a previous successfully completed authorization and authentication.

Computer-readable media having computer-executable instructions for a secure authentication and authorization service for networked portable media devices embody further aspects of the invention. Alternatively, embodiments of the invention may comprise various other methods and apparatuses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
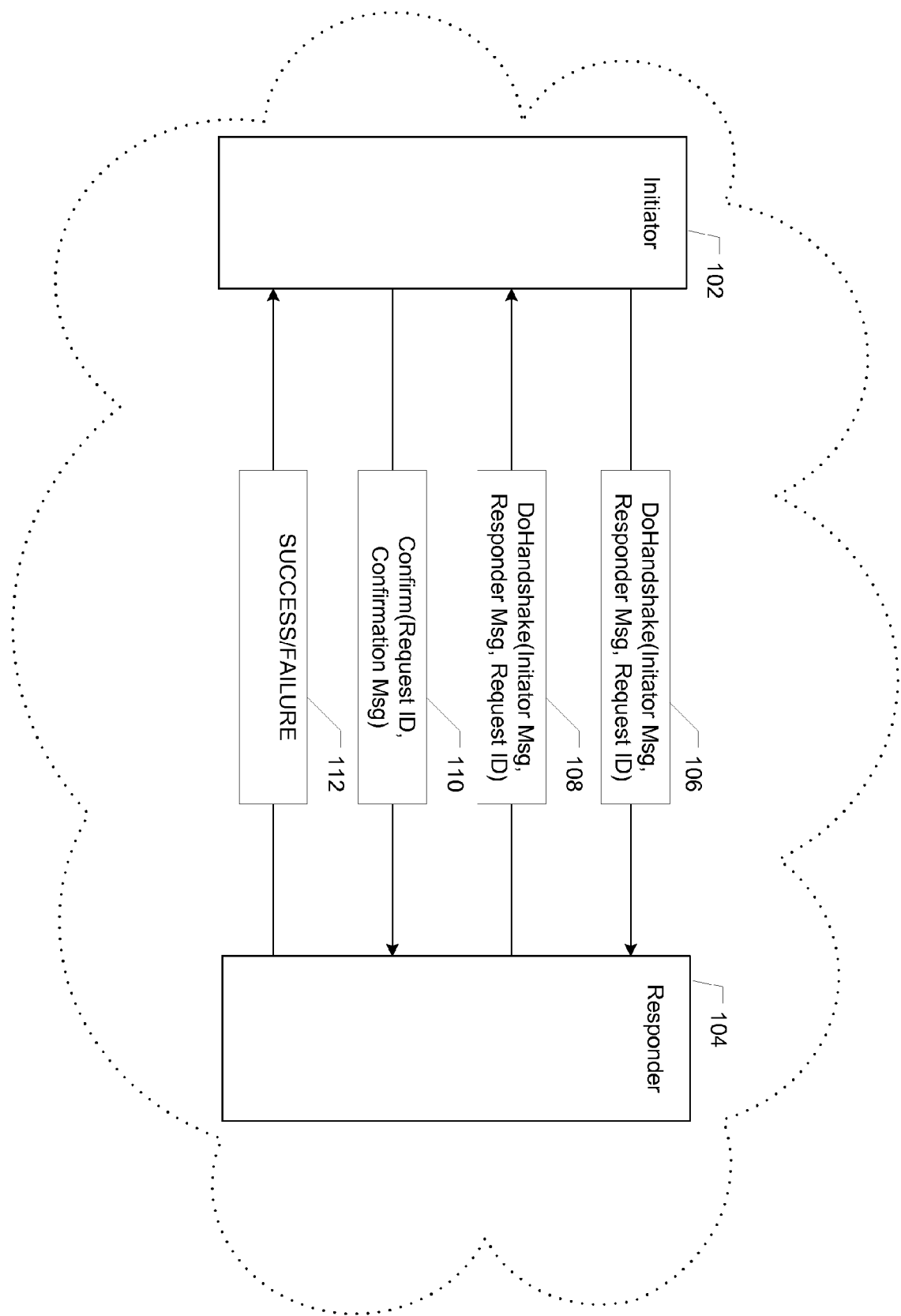
FIG. 1 is a block diagram illustrating a computing system environment for an authentication and authorization service according to an embodiment of the invention.

Referring to the drawings, FIG. 1 shows a system for an authentication and authorization service according to aspects of the invention. Advantageously, embodiments of the invention allow one UPnP (Universal Plug and Play) device to authenticate and authorize another UPnP device by adding, for example, a new secure service to the UPnP protocol in an extensible manner without changing the UPnP protocol itself.

In one embodiment, a UPnP device implements one or more UPnP services in response to a request from a UPnP endpoint. It is to be understood that the UPnP endpoint can also be a UPnP device. For example, if a first device implements a UPnP service, it is by definition a UPnP device. If that same device requests a UPnP service implemented on a second UPnP device, the first device is also acting as a UPnP endpoint. In the illustrated embodiment, a UPnP endpoint such as initiator 102 and a UPnP device such as responder 104 are members of the same UPnP network. The UPnP architecture allows a device to dynamically join a network, obtain an IP address, convey its capabilities, and learn about the presence and capabilities of other devices. UPnP devices, endpoints, and the like include any device that implements the UPnP network protocol such as consumer electronics, computing devices, home automation devices, home security devices, appliances, portable media device, printing devices, digital cameras, scanners, computer networking devices, mobile devices, and the like.

An aspect of the invention implements a new UPnP Handshake Service that allows a UPnP endpoint (e.g., initiator 102) and a UPnP device(e.g., responder 104) to authenticate one or the other or each other (i.e., establish each other's identity in a secure manner). Once authenticated, each device can determine if the other device is authorized to communicate with it.

In an embodiment, the responder 104 is a general-purpose media server device that provides media content to UPnP media renderer devices, such as the initiator 102 on the network. For example, media servers include devices such as portable media devices, VCRs, CD Players, DVD Players, audio-tape players, still-image cameras, camcorders, radios, TV Tuners, and set-top boxes, MP3 servers, PVRs (Personal Video Recorders), and Home Media Servers such as a Personal Computer. In operation, the initiator 102 and the responder 104 execute computer-executable instructions such as those illustrated in the figures to implement aspects of the invention.

The initiator 102 and the responder 104 typically have at least some form of computer readable media. Computer readable media, which include both volatile and nonvolatile media, removable and non-removable media, may be any available medium that may be accessed by the initiator 102 and the responder 104. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the initiator 102 and the responder 104. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The media server exposes its content via the UPnP Content Directory service. The media server can handle any specific type of media, any data format, and transfer protocol. Examples of media content include MPEG2 video, CD audio, MP3 audio, WMA audio and JPEG images.

UPnP services are identified by a Universal Resource Name (URN). The URN is used when a device searches for services hosted by other devices, or when a device announces the availability of a service that it itself hosts. The URN for the Handshake Service can be chosen arbitrarily. In one embodiment of the invention, "urn:schemas-microsoft-com:service:Handshake:1" is the URN for the Handshake Service.

A secure UPnP device only accepts communication from other authenticated and authorized UPnP devices and endpoints. Thus, the secure UPnP device requires that the Handshake Service successfully authenticate and authorize a second device before the secure UPnP device allows the second device to access any other UPnP service implemented by the secure device.

In one embodiment, a UPnP endpoint that requests a service hosted by another UPnP device is referred to as initiator 102. For example, if the media renderer device requests a listing of available content offered by the media server device, the media renderer sends a request to the UPnP ContentDirectory service that is hosted by the media server device. In this example, the media renderer is the initiator 102 when it communicates with the ContentDirectory service, and the media server device is referred to as responder 104.

However, the same media renderer device may also host UPnP services of its own. In this case, the media renderer is acting as UPnP device as well as an UPnP endpoint. If the media server decides to use any of those services, then the roles are reversed and the media server is the initiator 102 and media renderer is the responder 104. In one embodiment, the handshake initiated by the media renderer to the media server and the handshake initiated by the media server to the media renderer are treated as two completely independent operations.

The UPnP protocol provides two standard ways for the initiator 102 to find the device that it wants to communicate with. First, the initiator 102 broadcasts an M-SEARCH request which solicits responses from all UPnP devices on the network that support the UPnP service identified by the URN in the M-SEARCH request. Second, the initiator 102 listens for NOTIFY messages. All UPnP devices periodically send NOTIFY messages announcing the availability of the services they host.

In an embodiment, the media renderer device searching for UPnP devices that implement the ContentDirectory Service would use M-SEARCH and/or NOTIFY messages to find the ContentDirectory service. The media renderer also uses M-SEARCH and/or NOTIFY messages to find the Handshake Service identified by the URN of the service. In this embodiment, the media renderer will only communicate with a ContentDirectory service if the same UPnP device hosts the Handshake Service as well as the ContentDirectory service. And, the media renderer will only use the ContentDirectory service if the Handshake Service has been successful. The ContentDirectory service is used for illustrative purposes, the Handshake Service may be implemented before any other UPnP service such as the ConnectionManager service or the AVTransport service.

In an alternative embodiment, the Handshake Service establishes a shared secret and symmetric encryption key. The shared secret is used to generate a security token 702 which can be used in subsequent UPnP or HTTP requests to establish that the request originates from a device that has already been authenticated and authorized. The security token 702 can be changed on each request, to make it harder for a rogue device to try to masquerade as an authorized device. Alternatively, the device's Ethernet MAC address or IP address can be used to identify requests from devices that have already been authenticated; however, as explained above, this implementation is less secure.

Figure 3:
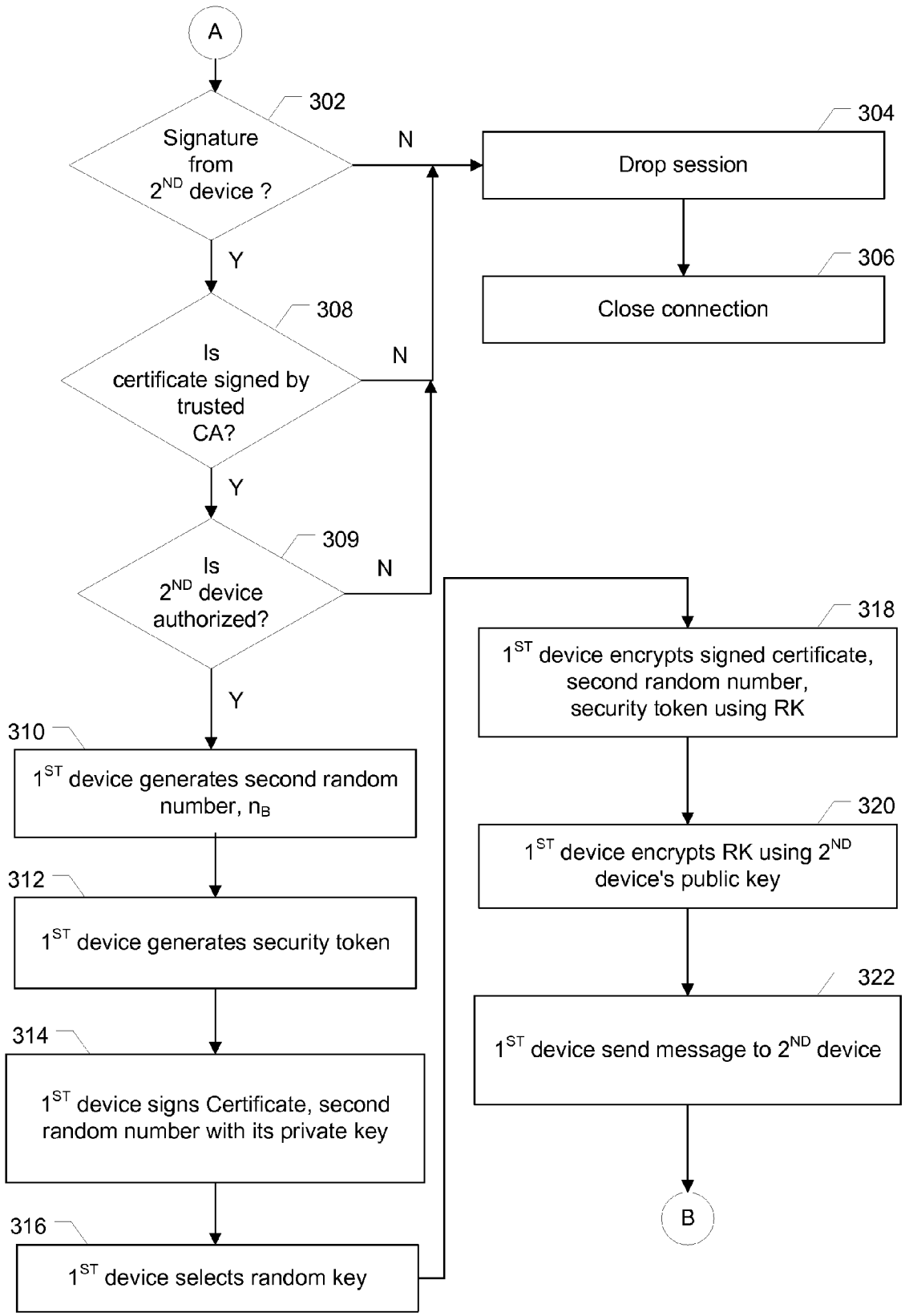
FIG. 3 is an exemplary flow diagram illustrating the creation of a response message according to an embodiment of the invention.
Figure 4:
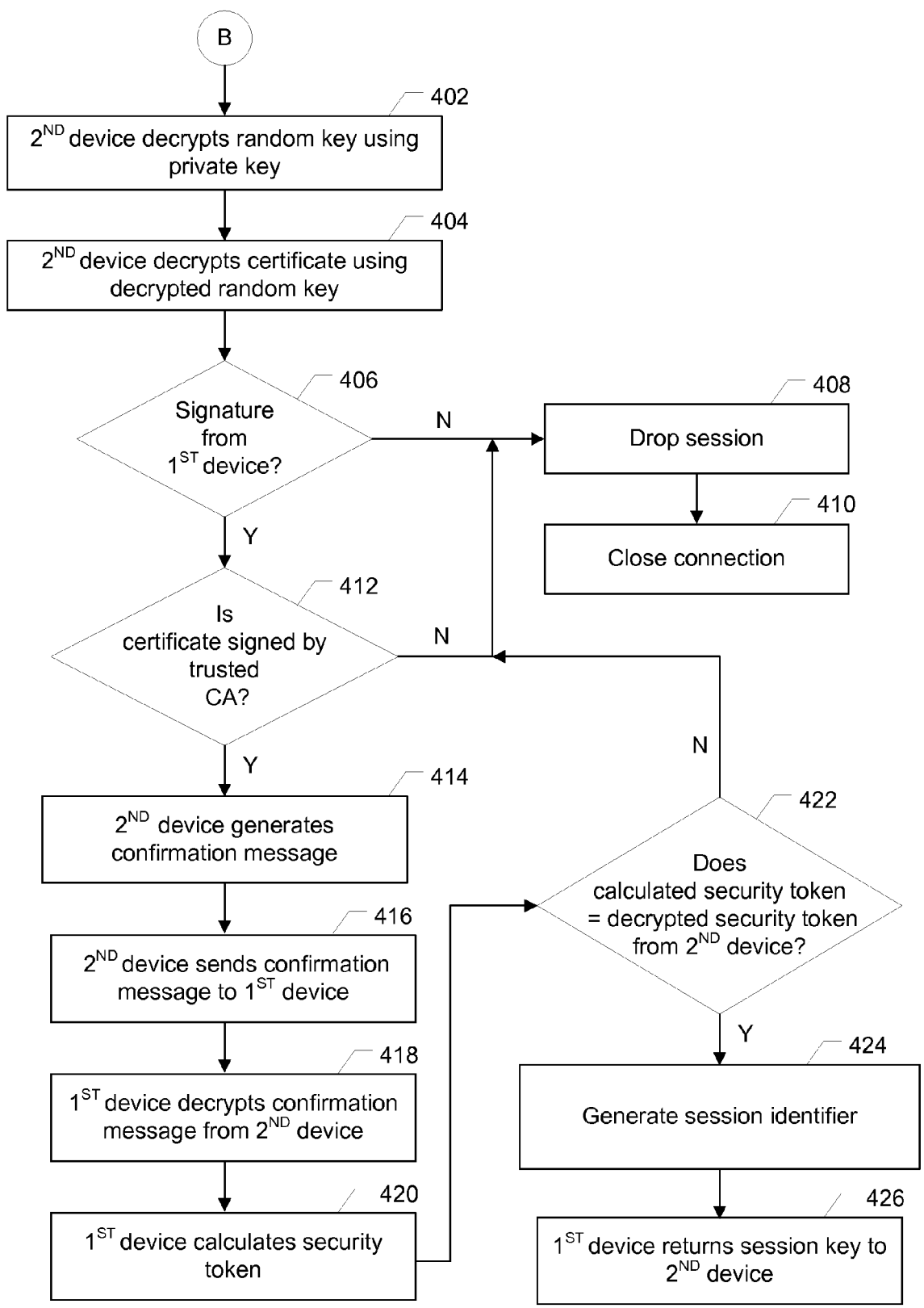
FIG. 4 is an exemplary flow diagram illustrating the creation of a confirmation message according to an embodiment of the invention.
Figure 5:
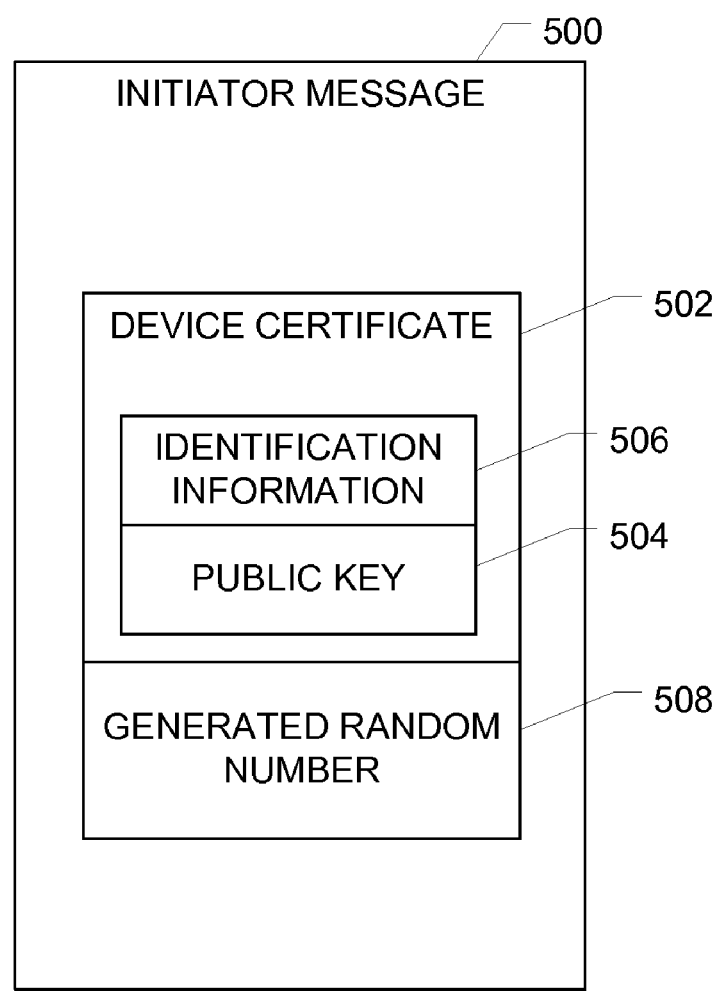
FIG. 5 is a block diagram of an initiating message according to an embodiment of the invention.

The symmetric encryption key that is established by the method illustrated in FIGS. 3-5 can be used to encrypt content that is being transferred after a device has been authorized. This provides an additional layer of security as it prevents unauthorized devices from eavesdropping on the communication between two mutually authorized devices. For example, the high-definition video stream mentioned above could be encrypted using the symmetric encryption key.

In one embodiment, in addition to the Handshake Service, new HTTP and UPnP headers are used in subsequent HTTP and UPnP requests after the initial handshake has been performed. In the alternative, an XML-based syntax is used instead of the UPnP header.

UPnP services have actions and events. The Handshake Service includes two actions and no events. An action is similar to a remote procedure call with input and output parameters. In one embodiment, to begin the Handshake Service, the initiator 102 invokes a DoHandshake action 106. The name of the action is of no consequence and could be different as long as the XML-format UPnP service description correctly describes the name.

In one embodiment, the DoHandshake action has one input parameter and two output parameters. In this embodiment of the invention, the input parameter is a initiator message 500, the first output parameter is a responder message 600, and the second output parameter is a request identifier. In an alternative embodiment, the initiator message 500, the responder message 600 are in a format. Additionally, since UPnP is a text-based protocol, the initiator and responder messages are Base64-encoded when they are transferred over UPnP.

The purpose of the initiator message 500 is to allow the responder 104 to authenticate the initiator 102. A DoHandshake action 106 sends the initiator message 500 from the initiator 102 to the responder 104. In the embodiment illustrated in FIG. 5, the initiator message 500 will contain a certificate 502 and public key cryptography is used for authentication. A certificate uses a digital signature to bind together a public key 504 with identification information 506 of the initiator 102, such as a device model number and serial number. The certificate can be used to verify that a public key 504 belongs to the initiator 102. In a typical public key infrastructure scheme, the signature will be of a trusted authority. The responder 104 can validate the signature and ascertain that the certificate is authentic. Advantageously, the responder 104 can distinguish between different initiators 102 and will be able to individually authorize each initiator 102 by using information that was included in the certificate 502. For example, suppose a responder 104 is only capable of streaming high-definition video content. The responder 104 lookups the device model number from the certificate 502 to determine if the initiator 102 is capable of rendering high-definition video content. If the initiator 102 is capable of rendering high-definition video content, the responder 104 authorizes the initiator 102.

In an alternative embodiment, the certificate includes the initiator's public key 504. Messages encrypted with the public key 504 can only be decrypted using the matching private key, which is known only to the initiator 102. In this embodiment, the initiator message 500 includes not only the certificate 502 but a random number 508 which is different each time the DoHandshake action is invoked. The random number 508 is used by the responder 104 to generate a shared secret. Alternatively, the random number 508 is any generated combination of numbers and characters.

Figure 6:
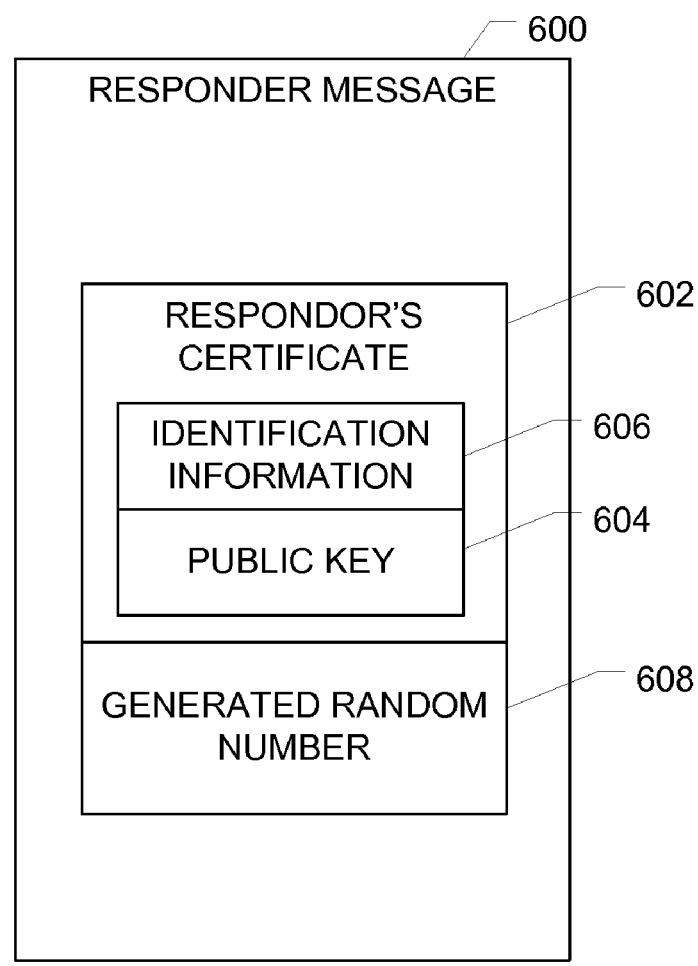
FIG. 6 is a block diagram of a response message according to an embodiment of the invention.

In one embodiment, the responder message 600 is an indication that the responder 104 was able to authenticate the certificate 502 in the initiator message 500. In an alternative embodiment illustrated in FIG. 6, the responder message 600 includes a certificate 602 of the responder 104 to allow the initiator 102 to authenticate the responder 104. The certificate 602 also includes identification information 606 of the responder 104 as well as the responder's public key 604. A DoHandshake action response 108 sends the responder message 600 and the request identifier from the initiator 102 to the responder 104.

As explained above, the certificate 602 is digitally signed either directly or indirectly by a trusted authority. And, by validating this signature, the initiator 102 can authenticate the responder 104. Additionally, the responder's certificate 602 is encrypted in a manner that uses the initiator's public key. In an alternative embodiment, the encrypted portion of the responder message 600 includes a random number 608 that is different each time the DoHandshake action is invoked. Alternatively, the random number 608 is any generated combination of numbers and characters.

In an embodiment, the second output parameter, the request identifier, is used to match subsequent UPnP or HTTP requests to a previous successfully completed DoHandshake action. In an embodiment where the responder 104 records the Ethernet MAC address of initiator devices that have successfully completed the DoHandshake action, the request identifier is not used because further requests are accepted or rejected based only on the Ethernet MAC address. In embodiments that utilize the request identifier, the request identifier is generated by the responder 104. In one embodiment, the request identifier is a random number. Alternatively, the request identifier is any generated combination of numbers and characters. However, in this embodiment, the responder 104 will not know if the initiator 102 was actually able to decrypt the encrypted certificate in the responder message 600. Without being able to ascertain this, it is possible that the initiator 102 used a certificate that was actually issued to a different device.

The second action in the UPnP Handshake Service, called the Confirm action, allows the responder 104 to confirm that the initiator 102 was able to decrypt the certificate in the responder message 600. The Confirm action 110 sends a confirmation message 700 from the initiator 102 to the responder 104.

The Confirm action 110 has two input parameters and no output parameters (other than a success/fail indication 112). The first input parameter is the request identifier that the responder 104 provided to the initiator 102 in the DoHandshake action response 108. In an embodiment, the request identifier is only valid for a limited period of time. Attempting to invoke the Confirm action with a request identifier that has expired causes the action to return a failure indication.

Figure 7:
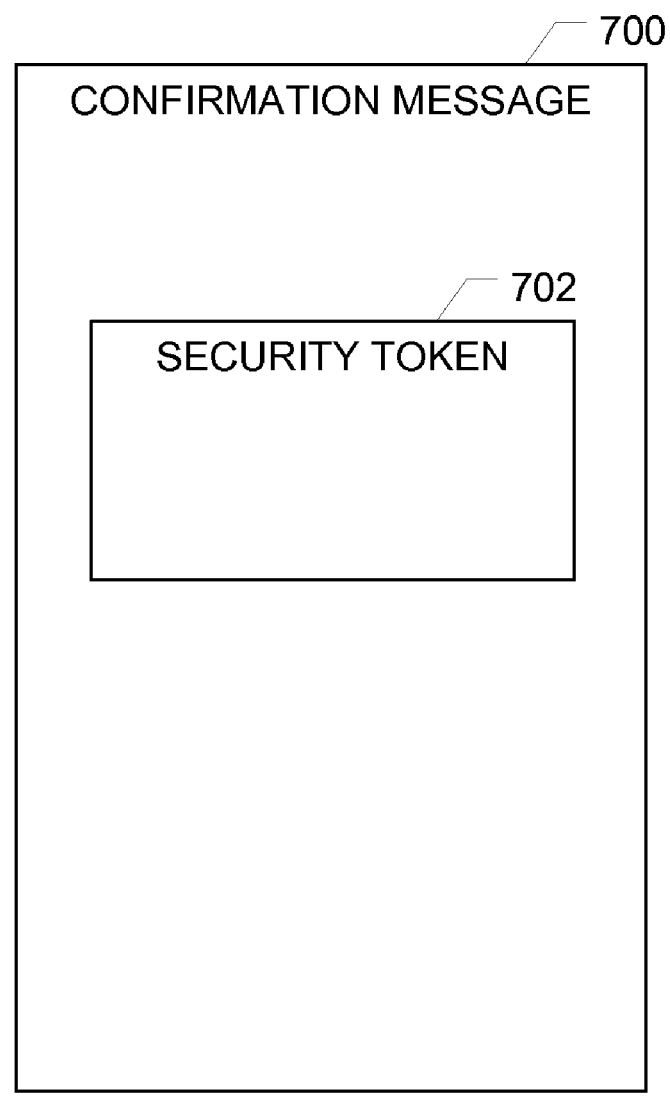
FIG. 7 is a block diagram of a confirmation message according to an embodiment of the invention.

In FIG. 7, a confirmation message 700 embodies the second input parameter. In this embodiment, the confirmation message 700 includes a security token 702. In one embodiment, the security token 702 is a digest of the shared secret 702. In an alternative embodiment, the security token 702 is a number known to the responder 104 and the initiator 102 and encrypted using, for example, an encryption key derived from the shared secret. In an embodiment, the confirmation message 700 is stored in a binary format. The shared secret is derived using the random number 508 in the initiator message 500 and the random number 608 in the responder message 600. Because the random number 608 in the responder message 600 was encrypted, if the initiator 102 includes the correct security token 702 in the confirmation message 700 it proves that the initiator 102 was able to decrypt the encrypted portion of the responder message 600. An indication of success or failure 112 is sent from the responder 104 to the initiator 102.

The security token 702 is not sent in clear text in the confirmation message 700. In an embodiment, the security token 702 is a number known to both the responder and initiator and encrypted using, for example, an encryption key derived from the shared secret. Alternatively, the security token 702 is a digest (hash) of the shared secret. In embodiments that desire to minimize CPU resources, a hash is implemented because hashes generally require less CPU resources to compute than encryption algorithms.

In an alternative embodiment, the two random numbers 508, 608 can also be used to derive a symmetric encryption key. The key can be used with some suitable encryption algorithm, such as AES (Advanced Encryption Standard), to encrypt UPnP and/or HTTP traffic that is sent after the handshake operation is complete. For example, it may be desirable to encrypt content that is being downloaded or streamed from a media server using this encryption key.

In one embodiment, the responder 104 can record the Ethernet MAC address of the initiator 102 device and add it to a table of devices that have passed the handshake and/or add it to a table of devices that are authorized (assuming the device was also successfully authorized). Subsequent UPnP and HTTP requests would be accepted or denied based on if the MAC address is in the authorized devices table.

In another embodiment of the invention, the request identifier parameter takes on the role of a session identifier. In this embodiment, the session identifier is used in subsequent UPnP and HTTP requests, to allow the responder 104 to know that the request is originating from a device that has completed the handshake operation.

In one embodiment, the session identifier parameter is identical to the previously described request identifier. Alternatively, the session identifier parameter includes a session token. The session token is generated as a function of the first and second random numbers such that a first generated session token is not equal to the second generated session token. In another alternative, the Confirm action is extended with one output parameter. The new output parameter is session identifier, which is only provided if the Confirm action succeeds.

In an alternative embodiment of the invention, the session identifier and the security token 702 are included in the UPnP and HTTP requests. In yet another embodiment, the security token 702 is different in each request. In one alternative, the security token 702 is derived from a number and both the initiator 102 and responder 104 increment the number on each UPnP or HTTP request. Alternatively, the security token 702 remains the same and an additional number (e.g., current time) is computed in the digest; the additional number is incremented or different on each UPnP or HTTP request.

In UPnP, protocol headers use the same syntax as HTTP headers, so it is possible to define a single protocol header that works for both protocols. In one embodiment, the session identifier and the digest of the secret are included in a UPnP/HTTP header utilizing ABNF (augmented Backus-Naur form) syntax:

"X-Handshake-Id:" <session-id> ":" <base64-encoded-digest-of-secret>

The <session-id> field is the session identifier parameter mentioned earlier and the <base64-encoded-digest-of-secret> field is the digest (hash) computed over the shared secret, after Base64-encoding has been applied to convert it to an ASCII representation.

EXAMPLE

X-Handshake-Id: 12345: ab0f12cd45eef1

(The Base64-ecoded digest is shown here for illustrative purposes and will be larger in practice.) In another variant on the invention, a header like the "X-Handshake-Id" header defined above is only used for HTTP requests.

Alternatively, for UPnP requests, the information is embedded inside the UPnP request message. The following is an example in XML syntax:

<msh:handshake xmlns:msh="schemas-microsoft-com:Handshake-1-0" msh:id="12345">
ab0f12cd45eef1
</msh:handshake>

Figure 2:
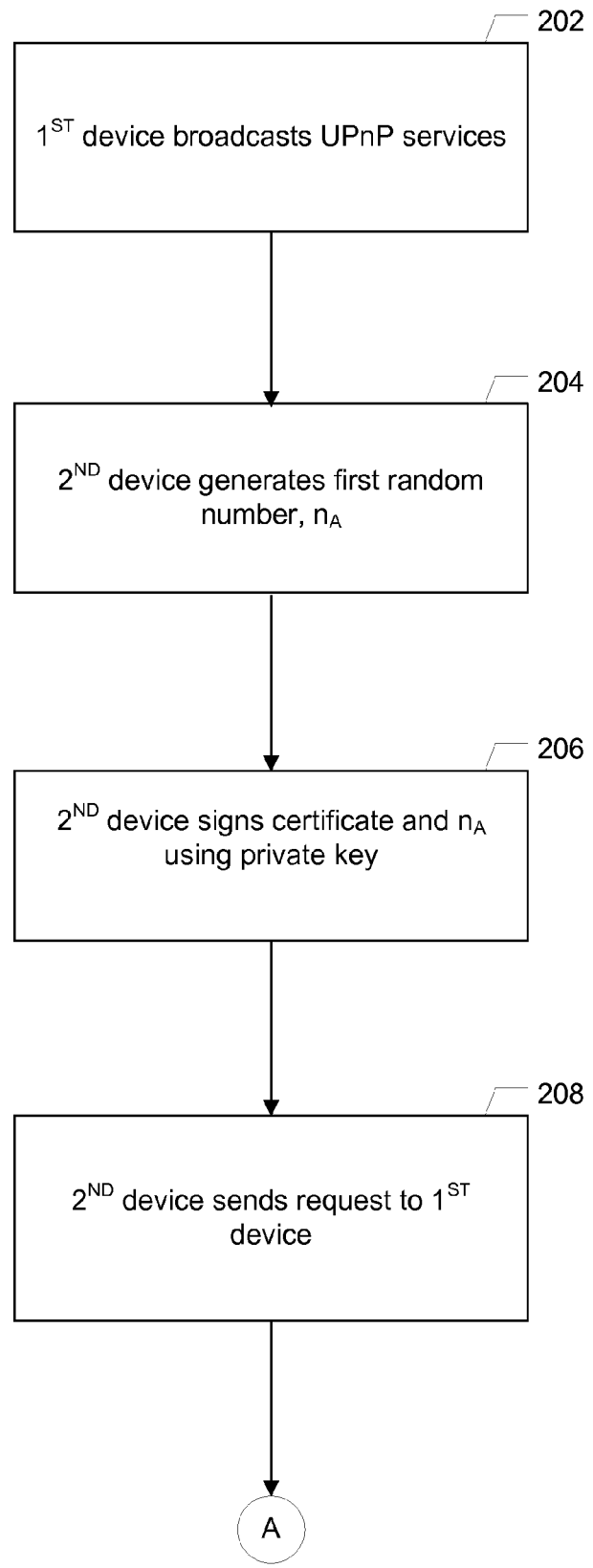
FIG. 2 is an exemplary flow diagram illustrating the creation of an initiator message according to an embodiment of the invention.

Referring now to FIG. 2, the figure illustrates the creation of an initiator message according to an embodiment of the invention. At 202, a first portable media device broadcasts a message via the network announcing the availability of hosted UPnP services. In an alternative embodiment, the network is a peer-to-peer network. In another embodiment, the first portable media device comprises a UPnP Control Point and the second portable media device comprises UPnP Media Renderer. Alternatively, the first portable media device comprises a UPnP Media Renderer and the second portable media device comprises UPnP Control Point. The services include a Handshake Service and at least one additional UPnP service such as a content directory service. In an embodiment, the first portable media device periodically broadcasts a UPnP NOTIFY message announcing the availability of its hosted services. In an alternative embodiment, a second portable media device broadcasts an UPnP M-SEARCH request for the Handshake Service which solicits responses from all UPnP devices on the network that support the Handshake Service identified by the URN in the M-SEARCH request.

At 204, the second portable media device generates a first random number. In the alternative, the random number can be any combination of letters and numbers. In an embodiment, the first portable media device is a UPnP device such as the responder and the second portable media device is a UPnP endpoint such as the initiator illustrated in FIG. 1. In an alternative embodiment, the second portable media device is also a UPnP device. In another embodiment, the random number will be included in a request to the first portable media device and used to generate a shared secret that may used for symmetric encryption of further communications between the devices. Alternatively, the random number is used to establish a session identifier included in further communication between the devices.

At 206, the second portable media device formats identification information and a digital signature into the request to the first portable media device. In an embodiment, the second portable media device signs a certificate from a trusted authority and the first random number using the private key of a public-private key pair. The certificate includes the identification information of the second portable media device, including at least one of the following: a device model number of the device, a serial number of the device, and a list of media formats supported by device. In an alternative embodiment, the data included in the request is formatted into a binary initiator message illustrated in FIG. 5.

At 208, the second portable media device sends the request to the first portable media device hosting the Handshake Service via the network. When used in a local area networking environment, the first and second portable media devices are connected to a LAN through a network interface or adapter. When used in a wide area networking environment, the first and second portable media devices typically include a network card or other means for establishing communications over a WAN, such as the Internet. The connections in the network environment may be wired network or direct-wired connection, and wireless media, such as Wi-Fi, acoustic, RF, infrared, and other wireless media. The network connections shown are exemplary and other means of establishing a communications link between the first and second portable media devices may be used.

Referring now to FIG. 3, the first portable media device receives the request from the second portable media device. Next, the first portable media device authenticates the second portable media device as a function of the digital signature of the second portable media device at 302-309. The authentication establishes the identity of the second portable media device.

At 302, the first portable media device verifies that the digital signature is from the second portable media device. In an embodiment, the signed certificate included in the initiator message is verified by a trusted authority. If the digital signature is not verified, the first portable media device drops the session at 304 and closes the connection with the second portable media device at 306. At 308, the first portable media device checks if the certificate included in the initiator message is from a trusted authority. If the certificate is not is from a trusted authority, the first portable media device drops the session at 304 and closes the connection with the second portable media device at 306.

Once the device has been authenticated, at 309, the first portable media device authorizes the second portable media device as a function of the identification information of the certificate. In an alternative embodiment, the first portable media queries the second portable media device to obtain a list of media formats supported by the second portable media device. In this embodiment, the first portable media device authorizes the second portable media device if the second device supports at least one compatible format. If the second portable media device is not authorized, the first portable media device drops the session at 304 and closes the connection with the second portable media device at 306.

Advantageously, the first portable media can restrict access to its services to licensed or approved devices through authorization. For example, suppose the first portable media device hosts a service that only streams high-definition video. The first portable media device will only authorize second portable media device if it is capable of rendering the high-definition video content. The first portable media device determines if the second portable media device is capable of rendering the high-definition video content by the identification information of second the portable media device (e.g., model number, serial number and supported media formats).

In an embodiment, the first portable media device records the MAC Ethernet address of the authenticated and authorized second portable media device in a table. In this embodiment, the first portable media device only accepts requests for hosted services from devices whose Ethernet MAC address have been recorded and the method terminates.

Alternatively, referring again to FIG. 3, at 310, the first portable media device generates a first random number. In the alternative, the random number can be any combination of letters and numbers. At 312, the first portable media device generates a security token 702. In one embodiment, the security token 702 is a hash of a shared secret generated from the first and second random numbers that may used for symmetric encryption (e.g., AES) of further communications between the devices or to establish a session identifier included in further communication between the devices.

At 314, the first portable media device formats a certificate, a digital signature, and the second random number into a response to the second portable media device. In an embodiment, the first portable media device signs a certificate from a trusted authority and the second portable media device can use the certificate and signature to authenticate the first portable media device. In an alternative embodiment, the data included in the request is formatted into a responder message illustrated in FIG. 6.

At 316, the first portable media device selects a symmetric encryption key (e.g., AES key) and encrypts the signed certificate, the second random number and the security token 702 using selected key at 318. At 320, the first portable media device encrypts the selected AES key with the second portable media device's public key. Advantageously, a human readable authentication string is not included in the response because the AES key is encrypted using the second portable media device's public key. Thus, only the device with the second portable media device's private key can decrypt the first portable media device's certificate and the hash.

At 320, the first portable media device sends the response message to the second portable media device via the network. In an alternative embodiment, a request identifier is included in the response. The request identifier is used by the first portable media device to match subsequent UPnP or HTTP requests from the second portable media device to a previous successfully completed authorization and authentication. In another embodiment, the request identifier is used to confirm that the second portable media device was able to decrypt the certificate in the response message. In this embodiment, a session identifier is included in the response to match subsequent UPnP or HTTP requests from the second portable media device to a previous successfully completed authorization and authentication.

Referring now to FIG. 4, the second portable media device receives the response from the first portable media device. Next, the second portable media device authenticates the first portable media device as a function of the digital signature of the first portable media device at 402-412. The authentication establishes the identity of the first portable media device. In an embodiment, the signed certificate included in the response message is verified by trusted authority.

At 402, the second portable media device decrypts AES key in the response message using its private key. At 404, the second portable media device decrypts the certificate of the first portable media device using the decrypted AES key. At 406, the second portable media device verifies that the digital signature is from the first portable media device. If the digital signature is not verified, the second portable media device drops the session at 408 and closes the connection with the first portable media device at 410. At 412, the second portable media device checks if the certificate included in the response message is from a trusted authority. If the certificate is not is from a trusted authority, the second portable media device drops the session at 408 and closes the connection with the first portable media device at 410.

Once the first portable media device has been authenticated, at 414, the second portable media device generates a confirmation including the received request identifier and the decrypted hash. In an alternative embodiment, the data included in the confirmation is formatted into a confirmation message illustrated in FIG. 7. In an embodiment, at least a portion of the confirmation is encrypted with the first portable media device's public key. In an alternative embodiment, the request identifier is only valid for a limited period of time (e.g., 10 seconds). If the second portable media device does not send the first portable media device the confirmation before the request identifier expires, the authentication and authorization fails and the second portable media device must begin the process again at step 302. At 416, the second portable media device sends the confirmation to the first portable media device.

At 418, the first portable media device decrypts confirmation message received from second portable media device using the first portable media device's private key. At 420, the first portable media device calculates the security token 702 from the first and second random numbers. At 422, the first portable media device compares calculated the security token to the decrypted the security token 702 of the confirmation message. If the two the security tokens are not equal, the confirmation fails and the first portable media device drops the session at 408 and closes the connection with the second portable media device at 410.

At 424, the first portable media device generates a session identifier. The session identifier is used by the first portable media device to match subsequent UPnP or HTTP requests from the second portable media device to a previous successfully completed authorization and authentication. In one embodiment, the session identifier is equal to the request identifier. In an alternative embodiment, the session identifier is a random value different than the request identifier. At 426, the first portable media device returns session identifier to the second portable media device to indicate the authentication and authorization of the second portable media device is complete.

Figure 8:
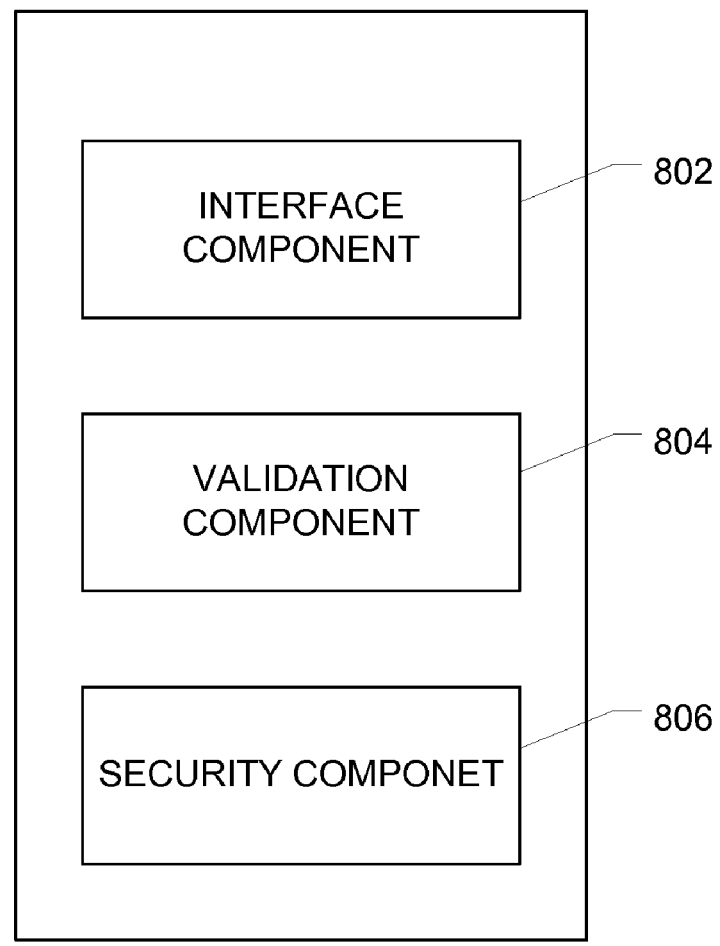
FIG. 8 illustrates computer-readable media having computer-executable components for authorizing and authenticating a media renderer by a media server.

FIG. 8 illustrates computer-readable media having computer-executable components for authorizing and authenticating a media renderer by a media server. In an embodiment, the media renderer and the media server are UPnP devices. Alternatively, the media renderer and the media server are portable media devices. In a third alternative, the media renderer is a UPnP endpoint and the media server is a UPnP device. The media server implements one or more UPnP services in an open network. In an alternative embodiment, the network is a peer-to-peer network. The components include an interface component 802, a validation component 804, and a security component 806.

The interface component 802 receives a request from the media renderer via the network. The request is associated with an initiating message which includes identification information of the media renderer and a digital signature. Additionally, the interface component 802 sends a response via the network to media renderer device indicating if the media renderer has been authenticated and authorized by the media server.

The validation component 804 authenticates the media renderer as a function of the digital signature of the request. In an embodiment, the digital signature is verified by a trusted authority. Additionally, the validation component 804 authorizes the media renderer device as a function of the identification information of the request. In an alternative embodiment, the media renderer device is queried to obtain a list of supported media formats. In this embodiment, the media renderer device is authorized if it supports at least one compatible format.

The security component 806 grants access to the media renderer to one or more services implemented by the media server if the media renderer was authorized and authenticated by the validation component and denies access to the media renderer if the media renderer was not authorized and authenticated by the validation component.

For purposes of illustration, programs and other executable program components, such as the interface component 802, the validation component 804, and the security component 806, are illustrated herein as discrete blocks. It is recognized, however, that such programs and components reside at various times in different storage components of the UPnP devices, and are executed by the data processor(s) of the devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for establishing a secure connection between a UPnP (Universal Plug and Play) device and a UPnP endpoint in an open network wherein the UPnP device and UPnP endpoint can dynamically join and leave said network, said method comprising:
   receiving, by a UPnP device, a request for one or more UPnP services implemented by the UPnP device, said request being received from a UPnP endpoint via the network, said request including identification information and a digital signature associated with the UPnP endpoint, said identification information including a device model number and a serial number of the UPnP endpoint, said request further including a random number that is different for each received request, and a digital signature binding an initiator public key with said identification information;
   authenticating the UPnP endpoint by the UPnP device as a function of the received digital signature of the UPnP endpoint to verify the identity of the UPnP endpoint;
   determining, based on the received device model number and the received serial number of the UPnP endpoint, if any of the requested one or more UPnP services are compatible with the UPnP endpoint;
   authorizing, if at least one of the requested one or more UPnP services is determined to be compatible with the UPnP endpoint, the UPnP endpoint by the UPnP device to access the at least one of the requested one or more services implemented by the UPnP device;
   sending a response to the UPnP endpoint from the UPnP device indicating if the UPnP endpoint has been authenticated and authorized by the UPnP device, said response including:
      a responder message, said responder message including a responder certificate and a responder public key, said responder certificate being encrypted with the initiator public key; and
      a request identifier for matching, by the UPnP endpoint, subsequent requests from by the UPnP device to a previously successfully completed request, said request identifier being valid for a limited period of time; and
   transmitting a confirmation by the UPnP endpoint to the UPnP device that the UPnP endpoint was able to decrypt the responder certificate, said confirmation including the request identifier and a security token, said security token being a number known to the UPnP endpoint and to the UPnP device and encrypted using an encryption key derived from a shared secret generated from the random number of the received request, wherein the UPnP endpoint and the UPnP device increment the number known to the UPnP endpoint and to the UPnP device for each request and the security token is different for each request.

2. The method of claim 1, wherein the digital signature is a certificate provided by a trusted authority.

3. The method of claim 2, wherein the certificate includes a public key of the UPnP endpoint and further comprising encrypting at least a portion of the response provided by the UPnP device with the public key of the UPnP endpoint.

4. The method of claim 1, wherein the identification information further includes a list of media formats supported by the UPnP endpoint.

5. The method of claim 1, further comprising authenticating the UPnP device by the UPnP endpoint with the responder certificate of the UPnP device.

6. The method of claim 1, wherein the response includes a session identifier, the session identifier being included in subsequent requests.

7. The method of claim 1, wherein the request includes a first random number generated by the UPnP endpoint and the response includes a second random number generated by the UPnP device, said response being encrypted with a public key of the UPnP endpoint, and further comprising confirming, in response to receiving the confirmation, the authentication and authorization of the UPnP endpoint by the UPnP device as a function of the security token.

8. The method of claim 7, further comprising:
   generating, by the UPnP device, a session identifier, said session identifier being included in the response to the UPnP endpoint, said session identifier further being included in subsequent requests from the UPnP endpoint and in subsequent responses from the UPnP device.

9. The method of claim 8, wherein the session identifier includes a session token, and further comprising generating said session token as a function of the first and second random numbers such that a first generated session token is not equal to a second generated session token.

10. The method of claim 9, wherein the session identifier and session token are embedded in an XML header of an UPnP request, said XML header having a tag format: <msh:handshake xmlns:msh='namespace specification' msh:id='session identifier'></msh:handshake>.

11. The method of claim 1, further comprising:
   recording an address associated with the UPnP endpoint by the UPnP device as a function the authorization and authentication of the UPnP endpoint, said address being used by the UPnP device to identify subsequent requests from the UPnP endpoint.

12. The method of claim 1, wherein one or more computer-readable media have computer-executable instructions for performing the method of claim 1.

13. A method for establishing a new secure handshake service among a plurality of UPnP (Universal Plug and Play) portable media devices in an open network wherein one or more of the UPnP portable media devices can dynamically join and leave said network, comprising:
   sending a message via the network announcing the availability of UPnP services hosted by a first portable media device, said services including the handshake service and at least one additional UPnP service;
   receiving a first request initiating the handshake service from a second portable media device via the network by the first portable media device, said request including an initiating message, said initiating message including identification information of the second portable media device, a random number that is different each time said handshake service is initiated, and a digital signature binding an initiator public key with said identification information;
   authenticating the second portable media device by the first portable media device as a function of the digital signature of the second portable media device, said authenticating establishing the identity of the second portable media device;

authorizing the second portable media device by the first portable media device as a function of the identification information of the request, said authorizing determining if the second portable media device is permitted to communicate with the first portable media device;

sending a response to the second portable media device by the first portable media device via the network indicating if the second portable media device has been authenticated and authorized by the first portable media device, said response having an identical data structure to the received first request, said response including:

a responder message, said responder message including a responder certificate and a responder public key, said responder certificate being encrypted with the initiator public key; and a request identifier for matching, by the second portable media device, subsequent requests from the first portable media device to a previously successfully completed request, said request identifier being valid for a limited period of time;

encrypting a security token using an encryption key derived from a shared secret generated from the random number of the received initiating message, said security token being a number known to the first portable media device and to the second portable media device;

transmitting a confirmation in binary format by the second portable media device to the first portable media device that the second portable media device was able to decrypt the responder certificate, said confirmation including the request identifier and the encrypted security token, wherein the first portable media device and the second portable media device increment the number known to the first portable media device and to the second portable media device for each request such that the security token is different for each request;

receiving a second request via the network from the second portable media device by the first portable media device for the at least one additional UPnP service hosted by the first portable;

wherein the second portable media device is allowed to access the at least one additional UPnP service hosted on the first portable media device if the second portable media device is authenticated and authorized by the first portable media device; and wherein the second portable media device is not allowed to the access at least one additional UPnP service hosted on the first portable media device if the second portable media device is not authenticated and authorized by the first portable media device.

14. The method of claim 13, wherein the first portable media device comprises a UPnP Media Server and the second portable media device comprises a UPnP Media Renderer.

15. The method of claim 13, wherein the first portable media device comprises a UPnP Media Renderer and the second portable media device comprises a UPnP Control Point.

16. A system of a media server for authorizing and authenticating a media renderer by the media server wherein the media server implements one or more UPnP services in an open network, said system comprising one or more processors for implementing:

an interface component for :

receiving a request via the network from the media renderer, said request including an initiating message, said initiating message including identification information of the media renderer and a digital signature; and sending a response via the network to the media renderer indicating if the media renderer has been authenticated and authorized by the media server, said response including:

a responder message, said responder message including a responder certificate and a responder public key, said responder certificate being encrypted with the initiator public key; and a request identifier for matching, by the media server, subsequent requests from the media renderer to a previously successfully completed request, said request identifier being valid for a limited period of time;

a validation component for :

authenticating the media renderer as a function of the digital signature of the media renderer, said authenticating establishing the identity of the media renderer; and authorizing the media renderer as a function of the identification information of the request, said authorizing comprising querying the media renderer to obtain a list of supported media formats and authorizing the media renderer if at least one media format compatible with the media server is supported by the media renderer; and a security component for:

granting access to the media renderer to one or more services implemented by the media server if the media renderer was authorized and authenticated by the validation component; and denying access to the media renderer to one or more services implemented by the media server if the media renderer was not authorized and authenticated by the validation component.

17. The system of claim 16, wherein the one or more processors further implement components for authenticating and authorizing the media server by the media renderer in response to a request sent by the media server.

18. The system of claim 16, wherein the media server and the media renderer are portable media devices.

* * * * *